Figure 1:
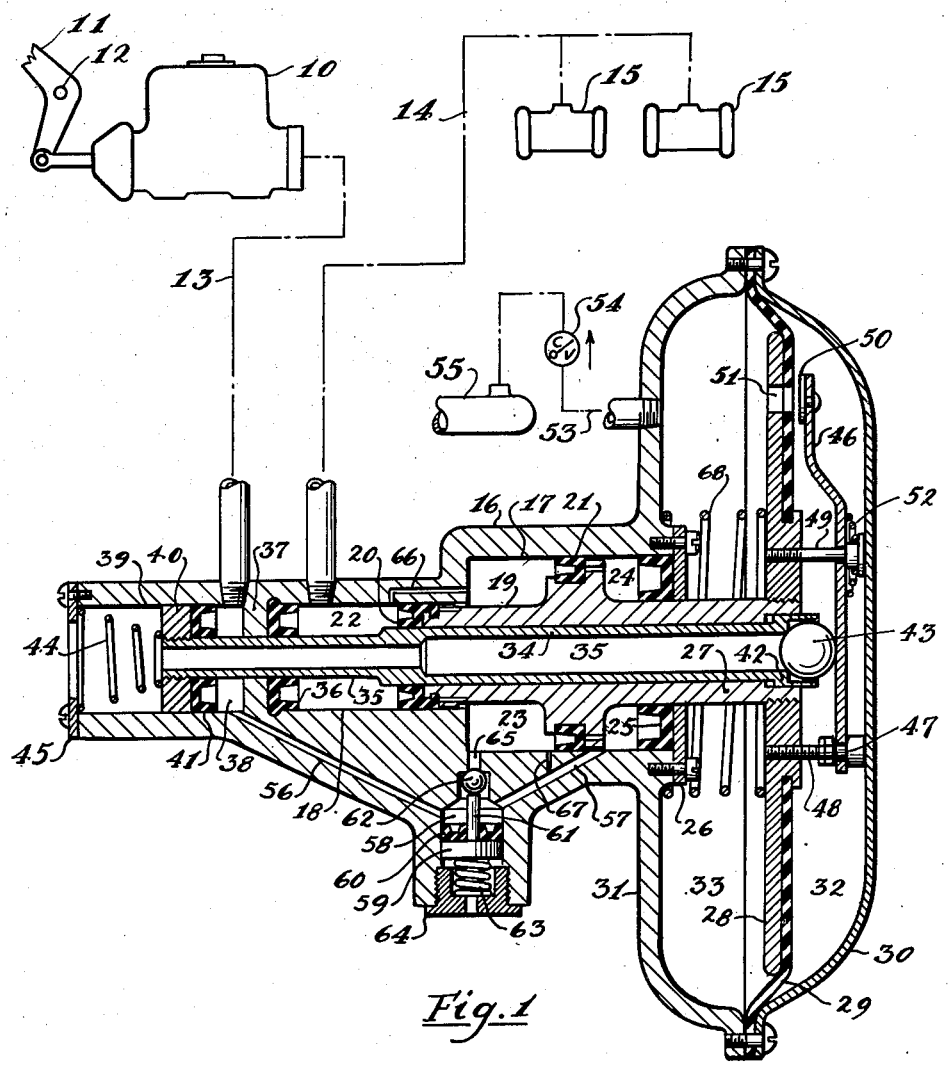

Dec. 5, 1950     W. STELZER     2,532,960
BRAKE BOOSTER

Filed Dec. 3, 1943     3 Sheets-Sheet 1

INVENTOR.
William Stelzer

Dec. 5, 1950  W. STELZER  2,532,960
BRAKE BOOSTER
Filed Dec. 3, 1943  3 Sheets-Sheet 2

INVENTOR.
William Stelzer

Dec. 5, 1950  W. STELZER  2,532,960
BRAKE BOOSTER
Filed Dec. 3, 1943  3 Sheets-Sheet 3

INVENTOR.
William Stelzer

Patented Dec. 5, 1950

2,532,960

UNITED STATES PATENT OFFICE 2,532,960

BRAKE BOOSTER

William Stelzer, East Orange, N. J.

Application December 3, 1943, Serial No. 512,688

9 Claims. (Cl. 60—54.5)

The invention relates to brake boosters and more particularly to a novel compounded booster having a large capacity at low pressures and a smaller capacity at higher pressures, the booster being primarily intended to increase the hydraulic pressure in hydraulic braking systems.

The object of the invention is to provide a brake booster of increased capacity without an increase in size.

Another object is to provide novel valve means for by-passing the hydraulic fluid when a certain pressure is reached.

Figure 2:
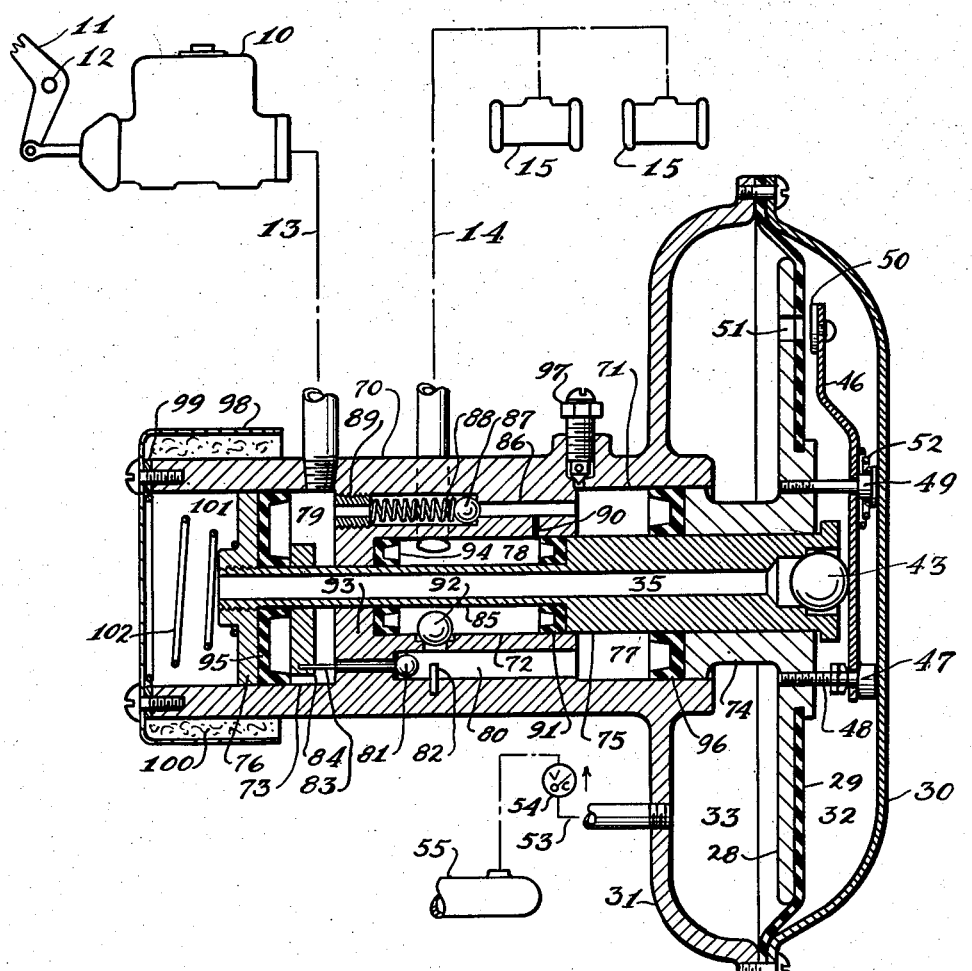

Other objects and advantages will become apparent by inspection of the drawings submitted for the purpose of illustration and not intended to define the scope of the invention, reference being had for that purpose to the subjoined claims. In the drawings:

Fig. 1 is a cross-sectional elevation of the improved booster connected with a conventional hydraulic braking system which is shown diagrammatically;

Fig. 2, a cross-sectional elevation showing a modified form of the booster; and

Figure 3:
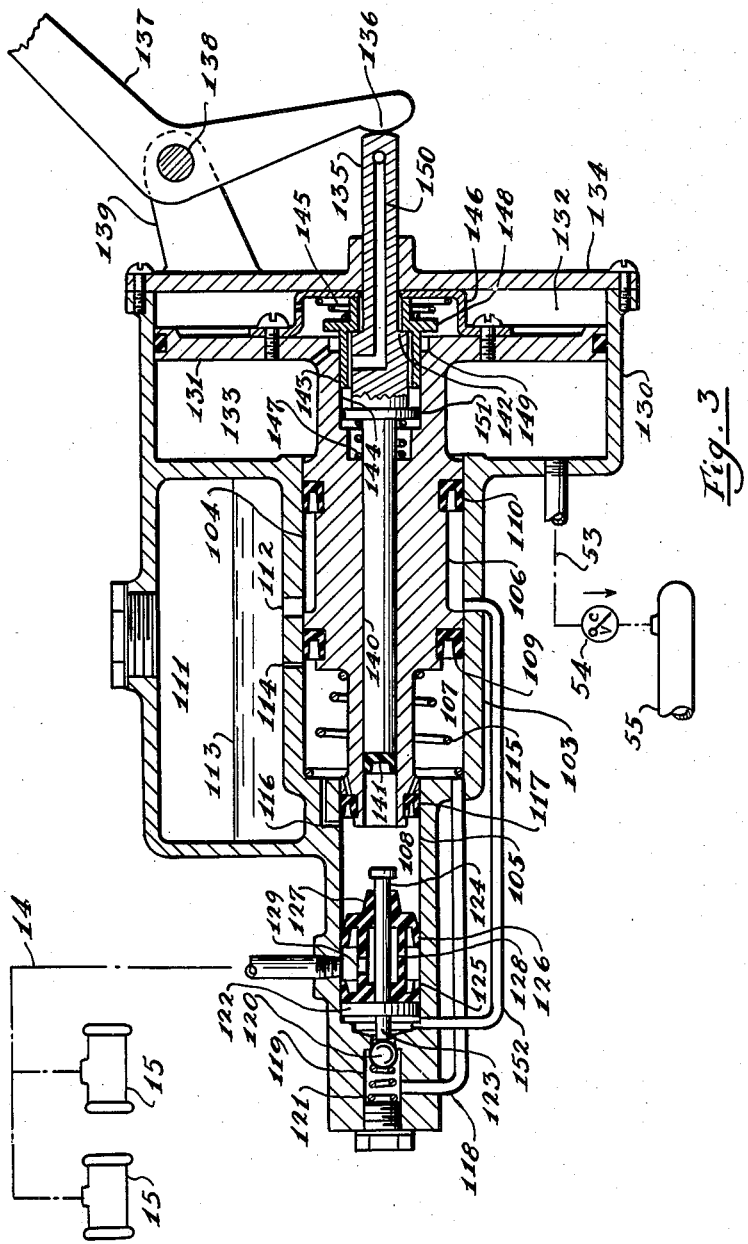

Fig. 3, a cross-sectional elevation of a further modification in which the booster is incorporated in the master cylinder of the hydraulic braking system.

Before explaining the present invention in detail, it is to be understood that the invention is not limited in its application to the details of construction and arrangement of parts illustrated in the accompanying drawings, since the invention is capable of other embodiments and of being carried out or practised in various ways, also it is to be understood that the phraseology or terminology employed herein is for the purpose of description and not limitation.

Referring now to Fig. 1, 10 indicates the conventional master cylinder of a hydraulic braking system, actuated by the operator by means of pedal 11 pivoted at 12. A hydraulic pressure line 13 leads to the novel booster, and from the latter another line 14 connects to the wheel cylinders or brake actuators 15 shown diagrammatically.

The booster itself comprises a cylinder or housing 16 having bores 17 and 18 in which slides power piston 19 provided with seals 20 and 21, creating chambers 22, 23, and 24. The latter is sealed with a seal 25 retained by a cap 26 secured to housing 16. Piston 19 has a portion 27 which may be considered as its piston rod and is adapted to slide through seal 25 and cap 26, being secured at its end to a diaphragm plate 28 supporting a diaphragm 29 whose outer periphery is clamped between a housing cover or cylinder shell 30 and the enlarged cylindrical portion 31 of cylinder 16. Diaphragm 29 and plate 28 serve as the working piston of an expansible chamber motor mechanism of which elements 30 and 31 are a part. 32 and 33 denote the working chambers of the expansible chamber motor mechanism. Piston 19 and piston rod 27 have a central bore in which slides a hollow control piston 34 having at its left end a hollow piston rod 35 passing through seal 36 and partition 37 into chamber 38 of bore 39 where it carries a piston 40 and seal 41. The control piston 34 at its right extremity has a shoulder 42 to limit the movement of the piston towards the left relative to piston 19, said movement being intended to actuate the valves which control the expansible chamber motor mechanism. Valve or ball 43 ordinarily is seated on piston 34 to close off the atmospheric passage 35 against working chamber 32, the ball being urged on its seat by spring 44 retained by cap 45 secured to housing 16. The force of spring 44 also presses ball 43 against valve operating lever 46 pivotally held at 47 by stud 48 and guided by stud 49, both of which are secured to diaphragm plate 28, their heads serving as stops for the pistons to rest against cover 30 in the "off" or released position. The upper end of operating lever 46 carries a valve head or poppet 50 adapted to close passage 51 which communicates between chambers 32 and 33. A light conical spring 52 urges valve 50 in a closed position but is subordinated in strength to spring 44. Chamber 33 is connected through line 53 and check valve 54 to a source of vacuum 55, such as the intake manifold of an internal combustion engine.

Chambers 24 and 38 communicate thru passages 56 and 57, and chamber 58 in which slides a valve control piston 59 provided with a seal 60 and rod 61 contacting valve ball 62 urged against its seat by a helical spring 63 seated on a retainer 64 secured to the housing. Ball 62 keeps passage 65 closed which leads into chamber 23. From this chamber another passage 66 leads to chamber 22 where it serves as a port to be covered as soon as seal 20 has moved a short distance. Still another passage 67 leads from chamber 23 into passage 57 to be closed by seal 21 after it has moved a short distance. All the moving elements of the booster are shown in the starting, or "off" position, into which they are urged by spring 44, augmented by spring 68.

In the modified form of my invention shown in Fig. 2 the booster comprises a cylinder or housing 70 having cylinder bores 71, 72, and 73 in which slide power piston 74, high pressure piston 75, and low pressure piston 76, respectively, forming chambers 77, 78, and 79. The latter is in communication with chamber 77 through passage 80 in which check valve 81 is interposed, permitting flow of fluid from 79 to 77, but not vice versa. A pin 82 retains the ball 81. In the starting position of the booster, as shown, ball 81 is unseated by rod 83 extending from arm 84 secured to the hollow piston rod 85. Another connection between chambers 77 and 79 is through passage 86, which, however, is ordinarily closed by a ball relief valve 87 backed by a modulated spring 88 seated on a hollow retainer 89. Chamber 77 is also in communication with chamber 78 through port 90 positioned near the lip of seal 91. Between passage 80 and chamber 78 a ball check valve 92 is interposed allowing fluid to flow from chamber 77 into 78 but not vice versa. A wall 93 partitions off chambers 78 and 79, and piston rod 85 passes through it, a seal 94 serving to prevent leakage from 78 to 79. Piston 76 has a seal 95 and piston 74 a seal 96, the latter fitting also over piston 75 to serve a dual purpose. Chamber 78 is connected to the wheel cylinders through line 14, while 79 communicates with the master cylinder through line 13. To facilitate bleeding the hydraulic system, a bleeder screw 97 is provided, which is a conventional element and needs not be further described.

The left end of cylinder housing 70 carries an air cleaner cover 98 spaced from the housing by means of spacers 99 to provide a passage for air from the atmosphere through filtering material 100 into chamber 101 housing a spring 102 urging pistons 76 and 75 towards the right against valve ball 43 similar to the construction shown in Fig. 1. Since the expansible chamber motor mechanism is identical with that shown in Fig. 1, it needs not be further described.

In the modified construction in Fig. 3 the booster and master cylinder are combined in one unit, leading to a certain simplification, and comprising a cylinder or housing 103 having bores 104 and 105 in which slides a piston 106, forming chambers 107 and 108. The piston is provided with seals 109 and 110 sliding in bore 104. The space between these two seals is in communication with reservoir 111 through hole 112, 113 indicating the fluid level in the reservoir. A small hole 114 registers with the lip of seal 109 to provide communication between reservoir 111 and chamber 107 when the piston is in the starting or released position, into which it is urged by return spring 115. Another small hole communicating between 107 and 108 is at 116, near seal 117 of piston 106. A fluid transmitting line 118 leads from chamber 107 to bore 119 in which is housed a valve ball 120 seated by force of spring 121. Opposing spring 121 on the other side of ball 120 is a piston 122 having a central rod 123 in contact with ball 120. From the chamber between ball 120 and piston 122 a tube 152 connects to bore 104 at a place between seals 109 and 110. Another rod 124 extending from piston 122 into chamber 108 carries a piston seal 125 made of elastic material and having additional lips, 126 and 127 which serve as double check valves to maintain a residual pressure in line 14 and wheel cylinders 15. The seal has a central hollow portion 128 connected with a hole 129 so that the fluid from line 14 may enter chamber 128 and by expanding lip 127 return into chamber 108.

The expansible chamber motor mechanism is composed of a cylinder 130 which is part of cylinder 103, a piston 131 sliding therein to divide the space in the cylinder into chambers 132 and 133, the latter being permanently connected to a source of vacuum 55. Chamber 132 is sealed by a cover plate 134 whose central portion has a bearing through which slides control rod 135 engaged at 136 by brake pedal 137 pivoted at 138 on a bracket 139 extending from cover 134. Control rod 135 extends into bore 140 of piston 106, being provided at its end with a seal 141 which is subjected to the hydraulic pressure in chamber 108. The central portion of rod 135 is provided with a shoulder 142 cooperating with sleeve 143 which slides in bore 144 and is urged against said shoulder by a valve spring 145 seated on cap 146. However, spring 145 is subordinate in strength to spring 147 which forces rod 135 to the right until sleeve 143 rests against cap 146, the latter being secured to piston 131 and serving as a stop for the latter in the starting or "off" position. Sleeve 143 has a valve disc 148 adapted to seat on the face of piston 131 to close recess 149 which is in communication with vacuum chamber 133. Bore 144 is permanently open to the atmosphere through passage 150. While the movement of control rod 135 is limited to the right by cap 146, towards the left it is stopped by shoulder 151.

Having thus described my invention, I shall now explain the operation of the same. In Fig. 1 the booster is shown at rest, atmospheric valve 43 being closed and vacuum valve 50 open, so that chambers 32 and 33 are evacuated by the source of vacuum 55. Supposing now that the operator depresses brake pedal 11 to produce a hydraulic pressure in line 13 and chamber 38, this pressure is communicated via passages 56 and 57 to chamber 24. Due to the flexible nature of seals 21 and 20, fluid is permitted to flow past their lips into chamber 22 and from there to wheel cylinders 15 to apply the brakes, however, since a certain resistance is offered by the wheel cylinders, the fluid forced into chamber 38 from the master cylinder primarily moves piston 40 towards the left against the opposition of spring 44, carrying with it piston 34 and ball 43 to allow spring 52 to expand and push valve 50 into a closed position where lever 46 is arrested. Further movement of piston 34 towards the left permits ball 43 to unseat so that air from the atmosphere passes through bore 35 into chamber 32 to act on diaphragm 29, urging piston 19 towards the left. The fluid displaced in chamber 23 is forced over the outer lip of seal 20 into chamber 22 and from there is transmitted to the wheel cylinders to actuate the brakes. Ball 43 and disc 50 constitute a follow-up valve whose function it is to direct the right amount of air to and from chamber 32 to urge piston 28 to keep up with pistons 40 and 34. Thus if too much air were admitted into chamber 32, i. e., piston 28 would move faster than pistons 40 and 34, the relative movement would cause ball 43 to seat and disc 50 to unseat to arrest piston 28. While all the pistons move to the left in unison due to the air pressure in chamber 32, the movement is assisted by the hydraulic pressure from master cylinder 10 acting in chambers 24 and 38. Due to the assistance of the expansible chamber motor mechanism the hydraulic pressure in chambers 22 and 23 is greater than in the master cylinder circuit, whereby a smaller effort is required by the operator to apply the brakes. The ratio of the master cylinder pressure and the boosted pressure is the same as the ratio of the displacement of piston 34 in chamber 22 and of piston 40 in chamber 38. Thus by reducing the displacement of piston 34 in chamber 22 a larger part of the work is performed by the expansible chamber motor mechanism, resulting in a higher wheel cylinder pressure or a correspondingly lower master cylinder pressure. Since the combined displacement of the pistons in chambers 23 and 22 is relatively large, the expansible chamber motor mechanism would not have sufficient power to produce the high pressure required for a maximum braking effort. Therefore, a device is incorporated in the booster which by-passes the fluid displaced in chamber 23 so that only the fluid displaced in chamber 22 is effective. Assuming now that a hydraulic pressure is reached where the expansible chamber motor mechanism nearly exerts its full power, or where the shoes of the brakes are fully in contact with the drums, the hydraulic pressure produced by the master cylinder and acting on seal 60 in chamber 58 overpowers spring 63 and forces piston 59 to rest on retainer 64, so that ball 62 is unseated and hydraulic fluid from chamber 23 instead of being forced into chamber 22 may now by-pass through passages 65 and 57 into chamber 24. While this action does not take place suddenly, nevertheless the surge of fluid from 23 to 24 causes a condition where piston 28 has too much power, resulting in an advance of piston 19 to close valve 43 and if necessary to open vacuum valve 50. Since now the entire effort of the expansible chamber motor mechanism is limited to the displacement of seal 20, the boosted pressure obtainable in line 14 is greatly increased, affording a maximum braking effort and being in a pre-determined proportion to the manual effort.

When the operator releases pedal 11 the hydraulic pressure in line 13 and chamber 38 is reduced so that the existing hydraulic pressure in chamber 22 acting on piston 34 urges the latter toward the right to seat ball 43 and to unseat vacuum valve 50, equalizing the pressures in chambers 32 and 33. The hydraulic fluid returning from the wheel cylinders into chamber 22 urges piston 19 into its starting position. A low pressure is created in chamber 23, whereby the fluid in 24 displaced by the returning piston flows past the outer lip of seat 21 into chamber 23. Since the hydraulic pressure produced by the master cylinder is relieved, spring 63 expands again and presses ball 62 against its seat. After the pistons have returned to the starting position, ports 66 and 67 are uncovered by seals 20 and 21, repectively, and the fluid still returning from line 14 passes through port 66, chamber 23, port 67, passages 57 and 56, and chamber 38 back to the master cylinder.

The operation of the modification shown in Fig. 2 will now be briefly described. Depression of brake pedal 11 by the operator to actuate master cylinder 10 produces a hydraulic pressure in chamber 79 which is transmitted past check valve 81 to chamber 77 and past check valve 92 to chamber 78 and wheel cylinders 15 to apply the brakes. The hydraulic pressure acting on piston 76 urges the latter to the left, carrying with it piston 75 and ball 43 to energize the expansible chamber motor mechanism in a similar manner as already explained in the description of Fig. 1. As power piston 74 is forced to the left by the expansible chamber motor mechanism to follow-up piston 76, rod 83 which moves away in unison, permits check valve 81 to close so that a higher pressure is built up in chamber 77 and is communicated via check valve 92 to chambers 78 and from there to the wheel cylinders. Thus the combined displacement of pistons 74 and 75 is transmitted to the wheel cylinders to bring the shoes in contact with the brake drums. After a pressure is reached were the shoes are in contact with the drums, spring 88 yields to the increased hydraulic pressure in passage 86 acting on ball 87 so that fluid may flow from chamber 77 into 79. Thus the effective displacment of the booster is reduced to that of seal 91 of piston 75. While the latter is moved by manual power, nevertheless the fluid forced by the expansible chamber motor mechanism from chamber 77 to 79 assists in a manner as though the motor mechanism would act on piston 75 directly. With bores 71 and 73 of equal diameter, it is apparent that the displacement required of the master cylinder is equal to that of piston 75 or wheel cylinders 15. Because spring 88 continues to exert a pressure on ball 87 it causes a certain pressure drop in the fluid delivered from chamber 77 to 79. To reduce this loss to a minimum it is desirable to modulate spring 88 to yield at a low pressure where the shoes are in contact with the brake drums.

After the operator releases pedal 11, the hydraulic pressure in chamber 79 drops, so that the hydraulic pressure in 78 urges piston 75 to the right to close valve 43 and open 50. After the pistons have reached the starting position as illustrated in the drawing port 90 is uncovered by seal 91 so that the fluid still under pressure in line 14 may return through this port and via passage 86, chamber 77, passage 80, and chamber 79 to the master cylinder, check valve 81 being opened by rod 83.

In the operation of the booster illustrated in Fig. 3, depression of the brake pedal 137 by the operator causes movement of control rod 135 towards the left, followed by valve 148 until the latter is seated on the face of piston 131 to close off recess 149. Further movement of control piston 135 towards the left separates shoulder 142 from valve 148 so that air from the atmosphere is permitted to flow into chamber 132. The air flows through passage 150 into bore 144, from there it passes shoulder 142 and flows around the right hand extremity of valve 148 since it has left contact with cap 146 due to the action of spring 145. The chamber in which spring 145 is housed is in communication with chamber 132 so that the air allowed to pass by shoulder 142 acts on the entire surface of piston 131 to urge piston 106 to enter chambers 107 and 108. The fluid displaced in chamber 107 by piston 106 is forced past the outer lip of seal 117 into chamber 108, and from there past lip 126 into line 14 to actuate the wheel cylinders. Thus the manual effort exerted by the operator is merely to operate piston 135 against the hydraulic pressure in chamber 108, while the expansible chamber motor mechanism actuates piston 106 to follow piston 135, controlled by follow-up valve 148. After the brake shoes of the braking system are in contact with the brake drums, spring 121 yields to the increased hydraulic pressure acting on piston 122 through seal 125, whereby piston 122 comes to rest on the bottom of bore 105 and opens relief valve 120 so that fluid displaced in chamber 107 by-passes through the tube 118, bore 119, tube 152, and hole 112, into reservoir 111. Thus the motor mechanism only has to overcome the pressure acting against the small end of piston 106 sliding in chamber 108, so that a high pressure may be produced which is necessary for a maximum braking effort.

The braking pressure is then developed in chamber 108 by the reduced left hand end of the piston 106 and its seal 117, operated by motor piston 131, and by the seal 141 which develops manually generated pressure by movement of the brake pedal.

When the operator releases brake pedal 137, the hydraulic pressure in chamber 108 acting on seal 141 returns piston 135 to seat shoulder 142 on valve 148 and to force the latter away from piston 131 to equalize the pressures in chambers 132 and 133. The existing hydraulic pressure in chamber 108 then urges piston 106 into the released position while fluid is returned into chamber 107 past the outer lip of seal 109 from reservoir 111. After the starting, or release position is reached, as shown on the drawing, fluid may return from the wheel cylinders through ports 116 and 114. The fluid flowing from line 14 into chamber 108 cannot pass outer lip 126 of the residual pressure valve, but must enter through hole 129 and expand lip 127 to force a passage. The hydraulic pressure required to expand lip 127 provides the residual pressure which is necessary to prevent the admission of air into the hydraulic lines. While this element in a different from is conventional in present day master cylinders, it is not an object of this invention, as any type of residual pressure valve may be used.

Having thus described my invention, I claim:

1. In a hydraulic brake system having wheel cylinders to apply the brakes, in combination, manually operable means for displacing fluid into the wheel cylinders to apply the brakes, a booster comprising a low pressure chamber and a high pressure chamber, pistons in said chambers, means to transmit the pressure of the fluid displaced by said manually operable means to act on said pistons and to force them into said chambers, fluid pressure transmitting means to conduct the fluid displaced in said chambers to said wheel cylinders, a power operated motor mechanism to assist the fluid from said manually operable means to force said pistons into said chambers, control means operable by fluid displaced by said manually operable means to energize said motor mechanism, a check valve arranged to prevent the return of fluid from said wheel cylinders to said low pressure chamber, and a hydraulic pressure responsive relief valve to bypass the fluid displaced in said low pressure chamber to join the fluid under pressure of said manually operable means so that said low pressure chamber becomes ineffective after a certain pressure is reached.

2. In a hydraulic braking system having wheel cylinders to actuate the brakes, in combination, manually operable means for displacing fluid into the wheel cylinders to apply the brakes, a booster comprising a high pressure chamber and a low pressure chamber, pistons in said chambers, an expansible chamber motor mechanism to actuate said pistons, a control piston in said high pressure chamber, a motor comprising a cylinder and a piston therein operated by the hydraulic fluid displaced by said master cylinder and arranged to move said control piston, follow-up valve means responsive to the movement of said control piston to energize said motor mechanism to move said pistons in unison with said control piston, and a relief valve to relieve the pressure produced in said low pressure chamber and to bypass the fluid displaced therein so that said piston in said low pressure chamber becomes ineffective.

3. The construction as claimed in claim 2 where the hydraulic fluid bypassed by said relief valve is transmitted to act on the back of the piston in said low pressure chamber.

4. In a hydraulic braking system having wheel cylinders to actuate the brakes, and a master cylinder operated by the operator, in combination, a booster comprising a high pressure chamber of small displacement, a piston therein, a cylinder and piston type motor of larger displacement operated by the hydraulic fluid from said master cylinder to move said piston in said high pressure chamber to produce an increased hydraulic pressure, fluid pressure transmitting means from said high pressure chamber to said wheel cylinders, a low pressure chamber, a piston therein, power operated means to actuate said piston, fluid pressure transmitting means from said low pressure chamber to said wheel cylinders with a check valve interposed to prevent the return of fluid to said low pressure chamber, a relief valve to direct the fluid displaced in said low pressure chamber to said cylinder and piston type motor to augment the volume displaced by said master cylinder after a certain pressure is reached, and follow-up valve means to energize said power operated means to actuate said piston in said low pressure chamber to move in unison with said piston in said high pressure chamber.

5. In a hydraulic braking system having wheel cylinders to apply the brakes, manually operable means for displacing fluid into the wheel cylinders to apply the brakes, a brake booster comprising a housing, a pair of chambers therein, a piston operable in each chamber for displacing fluid therefrom to the wheel cylinder, said pistons being rigidly connected to each other for operation in unison, a fluid pressure operated motor connected to said pistons, a valve mechanism for controlling said motor, an operating stem for said valve mechanism projecting axially through said pistons, said housing being provided with a control chamber communicating with said manually operable means, a control piston connected to said stem and movable in said control chamber according to pressure generated by said manually operable means, said housing having a passage communicating with one of said chambers, and a check valve carried by said housing for opening said passage to relieve pressure in said last named chamber and render such chamber inoperative after a predetermined pressure is reached therein.

6. In a hydraulic braking system having wheel cylinders to apply the brakes, in combination, manually operable means for displacing fluid into the wheel cylinders to apply the brakes, a booster comprising a low pressure cylinder and a high pressure cylinder, pistons in said cylinders arranged to move in unison, means to transmit the pressure of the fluid displaced by said manually operable means to said low pressure cylinder to actuate said pistons, means to conduct the fluid displaced by said pistons to said wheel cylinders, a motor mechanism to assist the fluid from said manually operable means to actuate said pistons, control means operable by fluid displaced by said manually operable means to energize said motor mechanism, and valve means arranged to bypass fluid displaced from said low pressure cylinder around the piston therein when the pressure in said low pressure cylinder rises to a predetermined point.

7. The construction as claimed in claim 6, wherein said valve means comprises a spring loaded relief valve to communicate such by-passed fluid to said manually operated means.

8. The construction as claimed in claim 7, wherein said valve means is provided with fluid pressure responsive means to counteract the loading of said relief valve and to hold such valve open at high pressures.

9. In a hydraulic braking system having wheel cylinders to apply the brakes, in combination, manually operable means for displacing fluid into the wheel cylinders to apply the brakes, a booster comprising a fluid pressure device in communication with said manually operable means to receive fluid under pressure from the latter, fluid displacing means in communication with said wheel cylinders to force fluid under pressure to said wheel cylinders, said fluid pressure device being arranged to actuate said fluid displacing means, a motor mechanism arranged to assist said fluid displacing means in displacing fluid to the wheel cylinders, control means operable by said fluid pressure device to energize said motor mechanism, and means including a spring loaded device for returning part of the fluid displaced by said fluid displacing means to said fluid pressure device to assist the latter in the actuation of said fluid pressure displacing means.

WILLIAM STELZER.

REFERENCES CITED

The following references are of record in the file of this patent:

UNITED STATES PATENTS

| Number | Name | Date |
| --- | --- | --- |
| 2,093,543 | Bowen | Sept. 21, 1937 |
| 2,190,238 | Lepersonne | Feb. 13, 1940 |
| 2,252,482 | Gates | Aug. 12, 1941 |
| 2,260,491 | Stelzer | Oct. 28, 1941 |
| 2,289,043 | Rockwell | July 7, 1942 |
| 2,317,601 | Fowler | Apr. 27, 1943 |
| 2,317,604 | Hamilton | Apr. 27, 1943 |
| 2,328,637 | Freeman | Sept. 7, 1943 |
| 2,332,340 | Price | Oct. 19, 1943 |
| 2,340,113 | Dodge | Jan. 25, 1944 |
| 2,347,349 | Humphrey | Apr. 25, 1944 |
| 2,374,235 | Roy | Apr. 24, 1945 |

FOREIGN PATENTS

| Number | Country | Date |
| --- | --- | --- |
| 747,273 | France | Mar. 28, 1933 |